(12) United States Patent
Veeraraghavan et al.

(10) Patent No.: US 11,764,702 B2
(45) Date of Patent: Sep. 19, 2023

(54) ADAPTABLE DC-AC INVERTER DRIVE SYSTEM AND OPERATION

(71) Applicant: Kripya LLC, Vancouver, WA (US)

(72) Inventors: Vilakkudi G Veeraraghavan, Vancouver, WA (US); Ramarao Ananathakrishnan, Coimbatore (IN); Asif Ismail, Chennai (IN); Murali Thangaraj, Chennai (IN); Thotakura Venkata Ravindra, Chennai (IN)

(73) Assignee: Kripya LLC, Vancouver, WA (US)

( * ) Notice: Subject to any disclaimer, the term of this patent is extended or adjusted under 35 U.S.C. 154(b) by 0 days.

(21) Appl. No.: 17/717,397

(22) Filed: Apr. 11, 2022

(65) Prior Publication Data

US 2022/0239235 A1 Jul. 28, 2022

Related U.S. Application Data

(63) Continuation-in-part of application No. 17/033,060, filed on Sep. 25, 2020, now Pat. No. 11,303,221.

(51) Int. Cl.
| | |
|---|---|
| *H02M 7/493* | (2007.01) |
| *H02J 3/38* | (2006.01) |
| *H02M 7/5395* | (2006.01) |
| *H02J 1/10* | (2006.01) |
| *H02M 1/32* | (2007.01) |
| *H02J 3/32* | (2006.01) |

(52) U.S. Cl.
CPC ............... *H02M 7/493* (2013.01); *H02J 1/10* (2013.01); *H02J 3/381* (2013.01); *H02M 1/32* (2013.01); *H02M 7/5395* (2013.01); *H02J 3/32* (2013.01); *H02J 2300/24* (2020.01); *H02J 2300/30* (2020.01)

(58) Field of Classification Search
CPC ...... H02M 7/493; H02M 1/32; H02M 7/5395; H02J 1/10; H02J 3/381; H02J 3/38; H02J 2300/24; H02J 2300/30; H02J 3/32
See application file for complete search history.

(56) References Cited

U.S. PATENT DOCUMENTS

| | | | |
|---|---|---|---|
| 2011/0012430 A1* | 1/2011 | Cheng | ............... H01L 31/02021 307/82 |
| 2012/0313443 A1 | 12/2012 | Cheng et al. | |
| 2022/0103092 A1 | 3/2022 | Veeraraghavan et al. | |

* cited by examiner

*Primary Examiner* — Robert L Deberadinis
(74) *Attorney, Agent, or Firm* — Lee & Hayes, P.C.

(57) ABSTRACT

Disclosed is an adaptable DC-AC inverter system and its operation. The system includes multiple DC input sources as input to provide a stable operation under various conditions. DC input sources may be added to the system or removed from the system without impacting the functionality of the system. The disclosed system is suited for solar energy harvesting in grid-connected or off-grid modes of operation.

19 Claims, 7 Drawing Sheets

ADAPTABLE DC-AC INVERTER DRIVE SYSTEM AND OPERATION

CROSS REFERENCE TO RELATED APPLICATION

This application is a continuation-in-part of commonly assigned, co-pending U.S. patent application Ser. No. 17/033,060, filed Sep. 25, 2020, entitled "DC-AC INVERTER DRIVE SYSTEM AND OPERATION," which is incorporated by reference in its entirety herein.

FIELD OF THE INVENTION

The present invention relates to systems and methods of operation of direct current-to-alternating current (DC-AC) inverters operating as an interconnected array for applications such as solar energy harvesting in off-grid mode, and also to systems and methods of operation of an adaptable DC-AC inverter with varying number of DC source inputs.

BACKGROUND

Modular DC-AC inverters are becoming very popular for applications in solar energy harvesting due to several advantages such as modularity, safety, and lower sensitivity to shading and single module failure, as compared to traditional central inverters. The majority of the inverters are used in the grid connected mode where the reference voltage and frequency are provided by the grid. In addition, the grid acts as a sink for excess power generated by the inverters over and above the local load demand, and as a source for additional power when the power generated by the inverters is less than the local load demand. This enables a stable operation of the inverters in the grid connected mode of operation. However, there is a significant need for inverters operating reliably in the off-grid mode in several applications where access to grid power is not always available and even when available not very reliable. Conventional methods of paralleling output of multiple inverters to support a load do not provide a solution that is stable under varying load conditions. In most of these cases synchronization of output voltage, frequency and phase angle are very difficult, and the output voltage becomes unstable under varying load conditions.

The present disclosure is targeted to address these limitations of operating DC-AC inverters and to enable a well-synchronized, stable output voltage to support varying load conditions, both in grid-connected and off-grid modes of operation.

SUMMARY

Described herein is a drive system and its operating methods for an array of DC-AC inverters operating in off-grid mode of operation wherein the alternating current (AC) output of the inverters are connected in parallel. One of the DC-AC inverters in the array is configured as a control unit and the remaining DC-AC inverters in the array are configured as follower units. The control unit computes the duty cycle for the pulse-width modulation (PWM) drive signals at the switching frequency of the DC-AC converter based on the input direct current (DC) voltage and the required output AC characteristics such as, without limitation, voltage, wave form and frequency. The PWM drive signal duty cycles are adjusted (e.g., constantly) based on the voltage feedback signals from an AC bus. The PWM drive signals are used for generating the required AC output waveform in the control unit. In addition, a reference PWM signal along with a PWM synchronization signal and zero cross synchronization signal from the control unit are transmitted to the follower units via a communication port of the control unit.

The follower units receive the reference PWM drive signal along with the PWM synchronization signal and the zero crossing synchronization signal via respective communication ports of the follower units. Reference PWM signal duty cycles are determined by the follower units via respective electronic capture modules of the follower units. Respective PWM modules in the follower units replicate the PWM drive signals based on the determined duty cycle, and the PWM drive signals are used for generating respective AC output waveforms in the follower units.

The synchronization signals (e.g., the PWM synchronization signal and the zero crossing synchronization signal) received by the follower units from the control unit are used to ensure synchronization of the AC output waveforms of the follower units with the AC output waveform of the control unit.

The use of common PWM drive and synchronization signals across all the inverters ensures the stability of the AC output waveform for the array of inverters connected in parallel under varying load conditions.

This summary is provided to introduce a selection of concepts in a simplified form described below in the detailed description. This summary is not intended to identify key features or essential features of the claimed subject matter, nor is it intended to be used to limit the scope of claimed subject matter.

Also described herein is an adaptable DC-AC inverter system and its operating methods. The inverter system includes multiple DC input sources configured to operate in a grid-connected mode of operation or an off-grid mode of operation. Each DC input source is connected to a respective power conversion module, wherein the alternating current (AC) outputs of the respective power conversion modules are connected in parallel. The power conversion modules are configured to be driven by common pulse-width modulation (PWM) drive signals generated by a PWM module in a controller sub-system of the inverter system. The controller sub-system is configured to compute the duty cycle for the PWM drive signals at the switching frequency of the power conversion modules based on the input direct current (DC) voltage and the output AC characteristics such as, without limitation, voltage, wave form, and frequency. The duty cycles for the PWM drive signals may be adjusted (e.g., constantly) based on the voltage feedback signals from an AC bus. The PWM drive signals may be transmitted to the power conversion modules through a communication port of the controller sub-system to a communication sub-system of the inverter system.

The power conversion modules are configured to receive the PWM drive signals from the communication sub-system at the respective communication ports of the power conversion modules. The PWM drive signals may be used for generating respective AC output waveforms in the power conversion modules.

The AC outputs from the power conversion modules may be transmitted to the AC bus in the communication sub-system. The combination of the AC outputs from the power conversion modules form the AC output of the inverter system.

The use of common PWM drive signals across the power conversion modules ensures the stability of the combined AC output waveform of the inverter system under varying load conditions. The disclosed inverter system also offers flexibility to add DC input sources to or remove DC input sources from the system without impacting the functionality of the system. In addition, the system maintains the advantages of modularity at the same time reducing cost by eliminating duplication of components in the system.

This summary is provided to introduce a selection of concepts described below in the detailed description in a simplified form. This summary is not intended to identify key features or essential features of the claimed subject matter, nor is it intended to be used to limit the scope of claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

In the following detailed description of embodiments, specific detailed examples are given to provide an understanding of the embodiments. However, it is to be appreciated that the embodiments may be practiced without these specific details. Furthermore, the techniques and systems disclosed herein are limited to the described embodiments. Numerous modifications, changes, variation, substitutions, and equivalents will be apparent to those skilled in the art.

Figure 1:
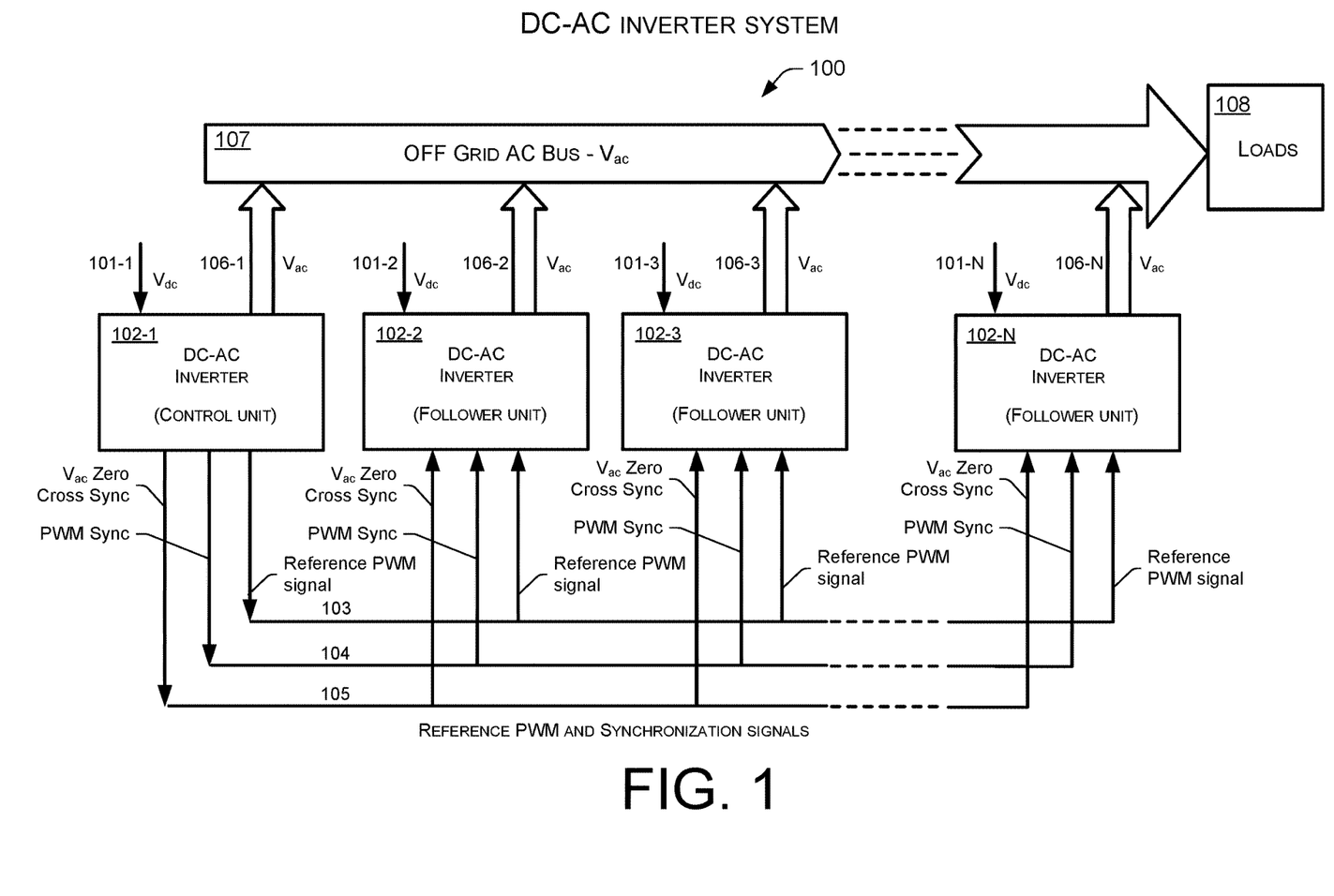
FIG. 1 is a schematic block diagram of an example DC-AC inverter system with multiple DC sources and associated DC-AC inverters working in off-grid mode of operation along with reference PWM and synchronization signals.

FIG. 1 is a schematic block diagram of an example DC-AC inverter system 100 with multiple DC input sources 101-1, 101-2, 101-3, . . . 101-N, and associated DC-AC inverters 102-1, 102-2, 102-3, . . . 102-N (sometimes referred to herein as "inverters 102") working in off-grid mode of operation. In this system the inverter 102-1 is configured as the control unit and the remaining inverters 102-2, 102-3, . . . 102-N are configured as follower units. Also presented are the reference PWM signal 103, PWM synchronization (sync.) signal 104 and $V_{ac}$ zero crossing signal 105. The $V_{ac}$ output 106-1, 106-2, 106-3, . . . 106-N represent the output from each of the inverters 102-1, 102-2, 102-3, . . . 102-N respectively which are connected to off-grid AC bus 107. The off-grid AC bus 107 is connected to the loads 108.

As an illustrative example, the DC-AC inverter system 100 may be a 3000 Watt roof top solar energy system operating in off-grid mode with ten 300 Watt solar panels as DC input sources (101-1, 101-2, 101-3, . . . 101-10) connected to ten inverters (102-1, 102-2, 102-3, . . . 102-10), each inverter 102 of a 300 watt capacity. The inverter 102-1 is configured as the control unit and the inverters 102-2, 102-3, . . . 102-10 are configured as follower units. The reference PWM signal 103 generated in the control unit 102-1 is shared with (e.g., sent to, transmitted to, communicated to, etc.) the follower units 102-2, 102-3, . . . 102-10 for replication and for driving the DC-AC converters in these follower units. The AC output 106-1, 106-2, 106-3, . . . 106-10 are connected to the off-grid AC bus 107 which supplies the energy to the load 108.

While in the above illustrative example the DC input sources 101-1, 101-2, 101-3, . . . 101-N are identified as solar panels, the techniques and systems described herein are equally applicable to different types of DC input source connected to the inverters. Some specific examples of possible DC input sources are (i) a photovoltaic solar panel, (ii) a fuel cell, (iii) a battery, (iv) a wind energy generator, or (v) an ultracapacitor.

It is to be noted that while in the above example inverter 102-1 is configured as the control unit, in practice, any one of the inverters (102-1, 102-2, 102-3, . . . 102-N) can be configured as a control unit and the remaining inverters configured as follower units. Also, the reconfiguration of a control unit into a follower unit and a follower unit into a control unit is possible.

The inverters (102-1, 102-2, 102-3, . . . 102-N) employ at least one of (i) one or more high frequency transformers, or (ii) one or more high frequency inductors; and operate in at least one of (i) a single-stage DC-AC conversion mode, or (ii) a two-stage DC-DC-AC conversion mode.

Also to be noted is that the inverter(s) (102-1, 102-2, 102-3, . . . 102-N) is/are one of: (i) a microinverter(s), (ii) a modular inverter(s), or (iii) a string inverter(s) with specifications of an (i) off-grid inverter, (ii) hybrid inverter, or (iii) dual mode inverter operating in off-grid mode of operation Also to be noted is that the inverters (102-1, 102-2, 102-3, . . . 102-N) can be of the same or different power ratings as long as they share a common switching frequency.

For the purpose of operating and controlling the inverters (102-1, 102-2, 102-3, . . . 102-N), the DC-AC inverter system 100 is equipped with one or more sensors and one or more fault protection features such as: a input DC voltage high and low limits sensor(s), an AC output voltage sensor(s), an output current limit sensor(s) and/or a temperature sensor(s).

Figure 2:
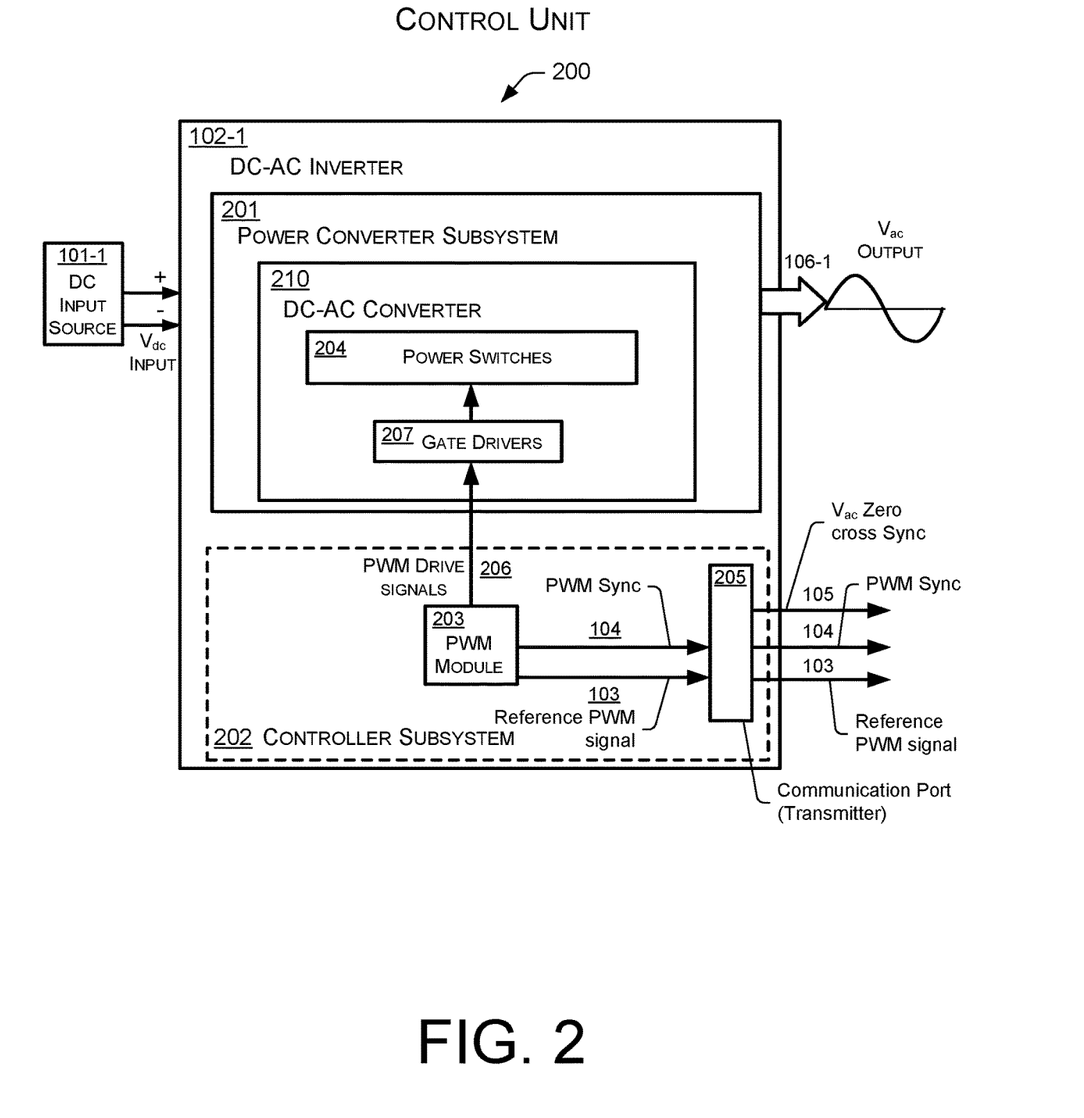
FIG. 2 is a schematic block diagram of an example DC-AC inverter configured as a control unit illustrating the power converter subsystem and controller subsystem. Also noted is a communication port(s) configured as the transmitter of the reference PWM and synchronization signals.

FIG. 2 is a schematic block diagram of an example DC-AC inverter 102-1 configured as a control unit 200 illustrating the power converter subsystem 201 and controller subsystem 202 of the control unit 200. Controller subsystem 202 has a PWM module 203 for generating the reference PWM signal 103 (sometimes referred to herein as a "reference PWM signal 103") and additional PWM drive signals 206 for driving power switches 204 through gate drivers 207 in the DC-AC converter 210. Also noted is a communication port(s) 205 configured as the transmitter of the reference PWM signal 103, PWM sync. signal 104, and $V_{ac}$ zero crossing signal 105 (sometimes referred to herein as a "zero crossing signal 105" or "zero crossing synchronization signal 105").

As an illustrative example, the PWM module 203 in the control unit 200 initially generates reference PWM signal 103 and additional PWM drive signals 206 at the switching frequency (for example 56 kilohertz (KHz)) of the power converter subsystem 201 whose duty cycles are computed based on the input DC voltage $V_{dc}$ 101-1 (for example 36 Volts (V)) and required output AC characteristics such as, without limitation, voltage (for example 220 V), wave form (for example sine wave) and frequency (for example 50 hertz (Hz)). Once initiated, the duty cycle of the reference PWM signal 203 and PWM drive signals 206 are dynamically controlled by the closed loop feedback of the AC bus 107 voltage to maintain the AC bus 107 voltage $V_{ac}$ within specified limits (for example between 210 and 230 V).

Figure 3:
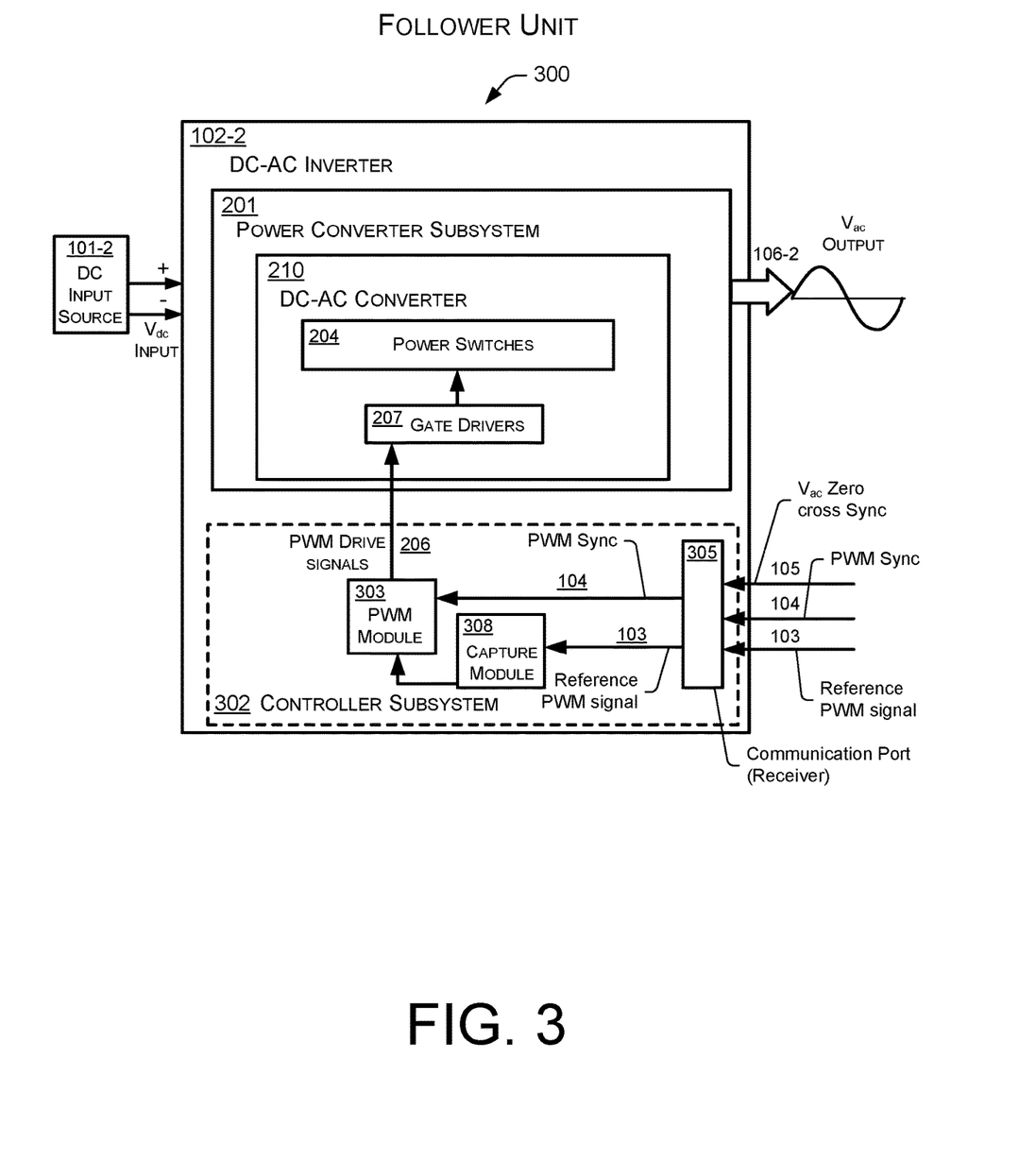
FIG. 3 is a schematic block diagram of an example DC-AC inverter configured as a follower unit illustrating the power converter subsystem and controller subsystem. Also noted is a communication port(s) configured as the receiver of the reference PWM and synchronization signals.

FIG. 3 is a schematic block diagram of an example DC-AC inverter 102-2 configured as a follower unit 300 illustrating the power converter subsystem 201 and controller subsystem 302 of the follower unit. Also noted is a communication port(s) 305 configured as the receiver of the reference PWM signal 103, PWM sync. signal 104, and $V_{ac}$ zero crossing signal 105 transmitted from the control unit 200.

Controller subsystem 302 has an electronic capture module 308 for determining the duty cycle of the received reference PWM signal 103, and a PWM module 303 for generating the PWM drive signals 206 by replicating the reference PWM signal 103 for driving the power switches 204 through gate drivers 207 in the DC-AC converter 210.

As an illustrative example, the communication port 305 configured as the receiver receives the reference PWM signal 103 at the switching frequency (for example 56 KHz) from the control unit 200. The capture module 308 determines the duty cycle of the reference PWM signals 103. Controller subsystem 302 configures the PWM module 303 for generating the PWM drive signals 206 by replicating the frequency and duty cycle of the reference PWM signal 103 for driving the power switches 204 through gate drivers 207 in the DC-AC converter 210. The power converter subsystem 201 in the follower unit 300 generates output AC voltage of required voltage, frequency, and waveform (for example 220 volts, 50 Hz, and sine wave). PWM sync. signal 104 and $V_{ac}$ zero crossing signal 105 transmitted from the control unit 200 and received by the follower unit 300 are utilized for ensuring the AC output $V_{ac}$ 106-2 waveform generated by the follower unit 300 is in synchronization with that generated by the control unit 200.

The communication port 205 for the control unit 200 and the communication port 305 for the follower unit 300 can be of wired or wireless type using industry standard or custom protocols.

The controller subsystem 202 for the control unit 200 and the controller subsystem 302 for the follower unit 300 can be of any one of a digital signal processor (DSP), a microcontroller, a Field Programmable Gate Array (FPGA), or an Application Specific Integrated Circuit (ASIC).

Figure 4:
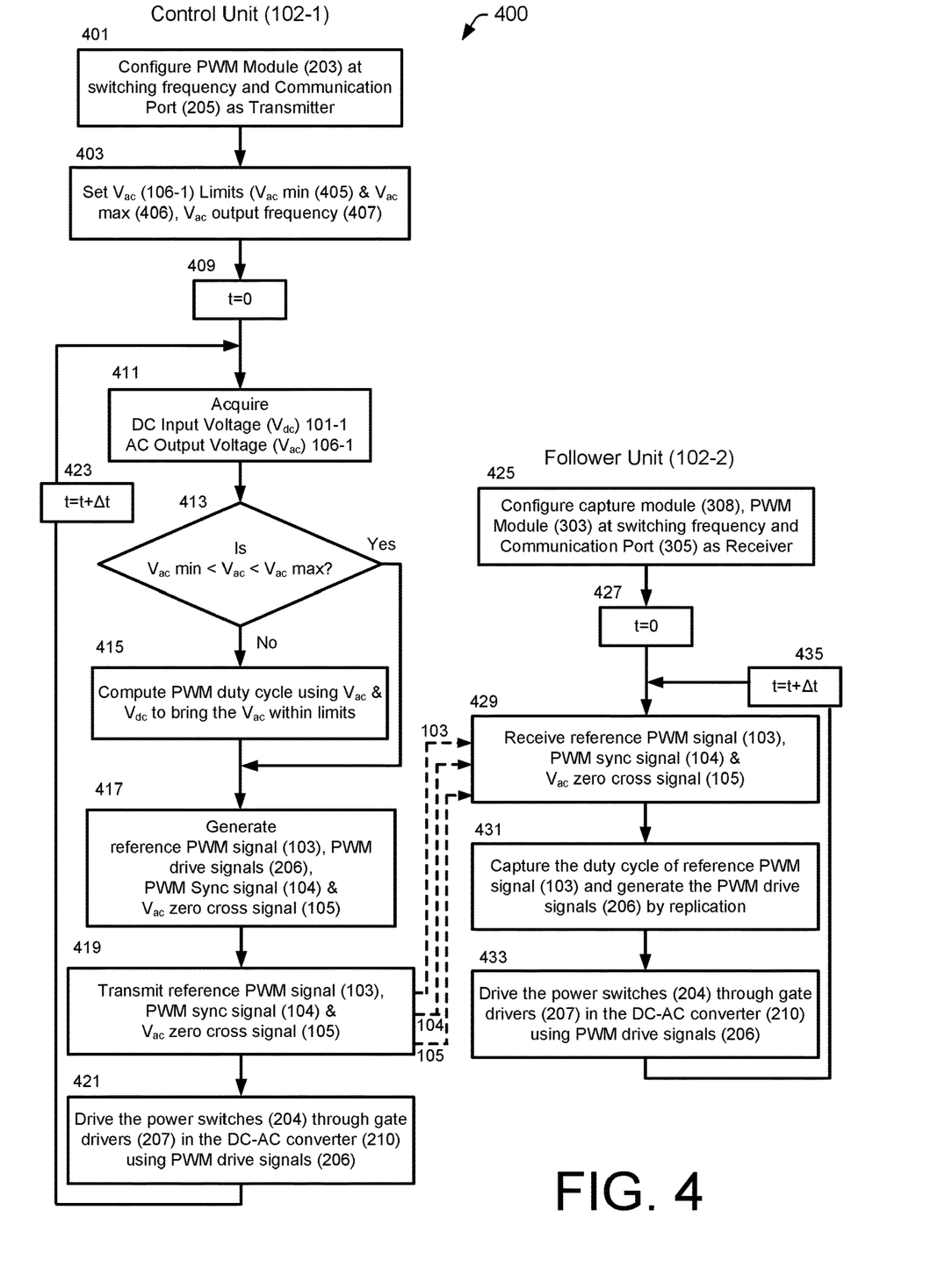
FIG. 4 is a flow diagram of an illustrative process for the operation of a DC-AC inverter system operating in the off-grid mode of operation. Also noted are the process for generating and communicating a reference PWM and synchronization signals from the control unit to the follower unit.

FIG. 4 is a flow diagram of an illustrative process for the operation of a DC-AC inverter system 100 operating in the off-grid mode of operation. The process flow 400 outlines the functions of the control unit 102-1 and the follower unit 102-2. Also noted are the process for generating and communicating a reference PWM signal 103, PWM synchronization signal 104, and $V_{ac}$ zero crossing signal 105 from the control unit 102-1 to the follower unit 102-2. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

As an illustrative example, the initialization step 401 of the control unit 102-1 involves configuring the PWM module 203 for a switching frequency (for example 56 KHz) of the power converter subsystem 201 and configuring the communication port 205 as a transmitter. The initialization step 425 of the follower unit 102-2 involves configuring the PWM module 303 for a switching frequency (for example 56 KHz) of the power converter subsystem 201 and configuring the communication port 305 as a receiver. The initialization step 425 may further involve configuring the capture module 308 in the controller subsystem 302 of the follower unit 102-2.

The initialization step 403 sets the $V_{ac}$ minimum limit 405, $V_{ac}$ maximum limit 406 and the $V_{ac}$ output frequency 407 for the output voltage $V_{ac}$ (for example 210 V, 230 V and 50 Hz, respectively).

The initialization step 409 sets the start clock time, t=0 for the control unit 102-1 and the initialization steps 427 sets the start clock time, t=0 for the follower unit 102-2.

The process steps 411-423 are associated with control unit 102-1. In process step 411 PWM module 203 acquires the DC input voltage $V_{dc}$ 101-1 and AC output voltage $V_{ac}$ 106-1 from the respective sensors. Process step 413 compares the value of $V_{ac}$ 106-1 with the $V_{ac}$ minimum limit 405 and $V_{ac}$ maximum limit 406 and verifies if the logic $V_{ac}$ minimum limit 405<$V_{ac}$ 106-1<$V_{ac}$ maximum limit 406. If this logic is satisfied, the process step 415 is skipped, and the process step 417 is performed. If the logic is not satisfied, process step 415 is performed where controller subsystem 202 computes, using $V_{dc}$ and $V_{ac}$ values, the duty cycle for the reference PWM signal 103. In process step 417 the PWM module 203 in the controller subsystem 202 generates the reference PWM signal 103, PWM drive signals 206, PWM synchronization signal 104 and $V_{ac}$ zero crossing signal 105. In process step 419 the communication module 205 in the controller subsystem 202 set in the transmit mode transmits the reference PWM signal 103, PWM synchronization signal 104 and $V_{ac}$ zero crossing signal 105 to the follower unit 102-2 communication module 305 set in the receiver mode. In process step 421, the PWM drive signals 206 are used to drive the power switches 204 in the DC-AC converter 210 of the control unit 102-1. This process flow (steps 411-421) is repeated at high frequency (for example 56 KHz) with time interval Δt (for example 17.85 microseconds) as indicated in step 423.

The process steps 429-435 are associated with follower unit 102-2. In process step 429 the communication module 305 in the controller subsystem 302 set in the receiver mode receives the reference PWM signal 103, PWM synchronization signal 104 and $V_{ac}$ zero crossing signal transmitted from the control unit 102-1 communication module 205 set in the transmitter mode. In process step 431, the capture module 308 determines the duty cycle of the reference PWM signal 103. Controller subsystem 302 configures the PWM module 303 for generating the PWM drive signals 206 by replicating the frequency and duty cycle of the reference PWM signal 103. PWM synchronization signal 104 is used to ensure the generated PWM drive signals are in synchronization with the reference PWM signal. In process step 433, the PWM drive signals 206 are used to drive the power switches 204 in the DC-AC converter 210 of the follower unit 102-2. $V_{ac}$ zero crossing signal 105 is used to ensure the AC output from the follower unit 102-2 is in synchronization with the AC output from the control unit 102-1, This process flow (steps 429-433) is repeated at high frequency (for example 56 KHz) with time interval Δt (for example 17.85 microseconds) as indicated in step 435.

The techniques and systems disclosed herein can be implemented in different embodiments of DC-AC inverter systems operating in off-grid mode of operation. For example, the controller subsystem 202 of the control unit 200 can be configured to integrate the functions of PWM drive signal generation and transmission to the follower unit(s) 300 instead of generating and transmitting a reference PWM signal 103 to the follower unit(s) 300. In this embodiment, the follower unit(s) may not include a controller subsystem 302, but may include the power converter subsystem 201. The controller subsystem 202 of the control unit 200 may comprise the PWM module 203 to generate PWM drive signals 206 at the switching frequency of the power converter subsystem 201 for driving the power switches 204 of both the control unit 200 and the follower unit(s) 300. Accordingly, these PWM drive signals 206 may be transmitted via the communication port 205 of the control unit 200 for receipt by the follower unit(s) 300, and the control unit 200 may refrain from transmitting a reference PWM drive signal 103 in this embodiment. The follower unit(s) 300 may receive, via their respective communication port(s) 305, the PWM drive signals 206 from the control unit 200 and may use the PWM drive signals 206 to drive the power switches 204 of the power converter subsystem(s) 201 of the follower unit(s) 300.

Figure 5:
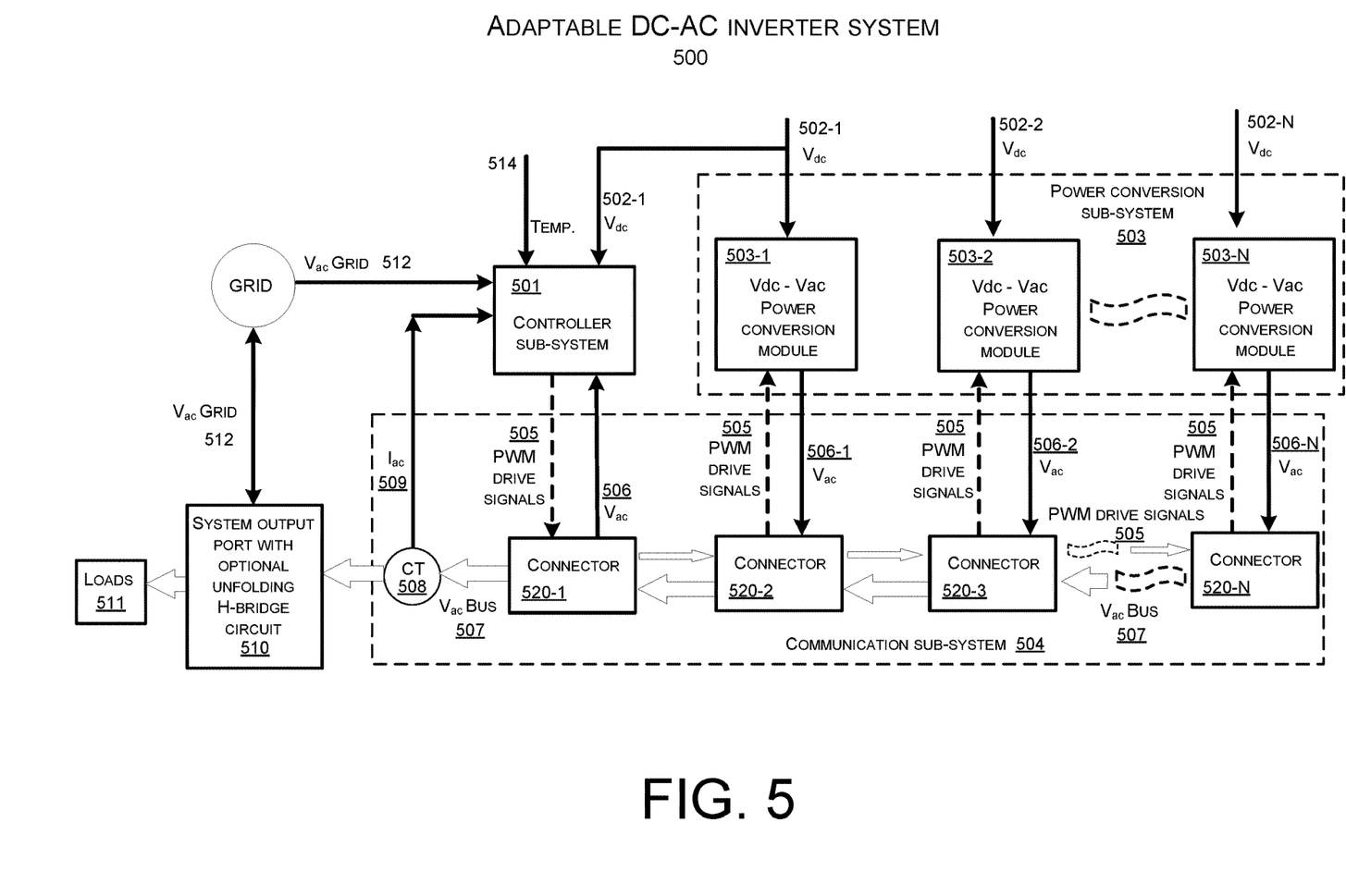
FIG. 5 is a schematic block diagram of an example Adaptable DC-AC inverter system with multiple DC sources. Controller sub-system, communication sub-system, power conversion sub-system along with the power conversion modules, system output port and the associated interconnections are illustrated. Also illustrated are the PWM drive signals generated by the controller sub-system feeding into the power conversion modules along the AC voltage output bus.

FIG. 5 is a schematic block diagram of an example adaptable DC-AC inverter system 500 including a controller sub-system 501, a power conversion sub-system 503, a communication sub-system 504, multiple DC input source providing DC input voltages 502-1, 502-2, . . . 502-N to associated DC-AC power conversion modules 503-1, 503-2, . . . 503-N working in conjunction with the communication sub-system 504. In some examples, the adaptable DC-AC inverter system 500 is auto-configurable to a number of the DC sources and associated power conversion modules 503. This offers flexibility to add DC input sources and associated power conversion modules 503 to or remove DC input sources and associated power conversion modules 503 from the system 500 without impacting the functionality of the system 500, as the system 500 is auto-configurable. Also illustrated are the PWM drive signals 505, and the Vac output 506-1, 506-2, . . . 506-N (or "AC output voltages" 506-1, 506-2, . . . 506-N). The Vac output 506-1, 506-2, . . . 506-N represent the output from each of the power conversion modules 503-1, 503-2, . . . 503-N, respectively, which are connected to AC bus 507 (sometimes referred to herein as "AC voltage output bus" 507). The AC bus 507 passes through a current transformer (CT) 508 for sensing the output current Iac 509 before connecting to the system output port 510 which is connected to the loads 511. In the case of grid-connected operation, the grid voltage (Vac Grid) 512 is connected to the controller sub-system 501 as well as the system output port 510. In certain embodiments of the adaptable DC-AC inverter system 500, the system output port 510 may incorporate an unfolding H-Bridge circuit.

As an illustrative example, the DC-AC inverter system 500 may be a 5000 Watt roof top solar energy system operating in off-grid mode with ten 500 Watt solar panels as DC input sources connected to ten power conversion modules (503-1, 503-2, . . . 503-N, where N=10), each of a 500 watt capacity. The PWM drive signals 505 generated in the controller sub-system 501 is shared with (e.g., sent to, transmitted to, communicated to, etc.) the power conversion modules 503-1, 503-2, . . . 503-N for driving the DC-AC converters in these power conversion modules 503-1, 503-2, . . . 503-N. The AC outputs 506-1, 506-2, . . . 506-N are connected to the AC bus 507 which supplies the energy to the load(s) 511 through the system output port 510.

While in the above illustrative example the DC input sources providing the DC input voltages 502-1, 502-2, . . . 502-N are identified as solar panels, the techniques and systems described herein are equally applicable to different types of DC input sources connected to the inverters. Some specific examples of possible DC input sources are (i) a photovoltaic solar panel, (ii) a fuel cell, (iii) a battery, or (iv) an ultracapacitor. Furthermore, it is to be appreciated that the adaptable DC-AC inverter system 500 may represent (i) an off-grid inverter, (ii) a hybrid inverter, or (iii) a dual-mode inverter.

The power conversion modules (503-1, 503-2, . . . 503-N) of the power conversion subsystem 503 may employ at least one of (i) one or more transformers (e.g., high frequency transformers), or (ii) one or more inductors (e.g., high frequency inductors); and operate in at least one of (i) a single-stage DC-AC conversion mode, or (ii) a two-stage DC-DC-AC conversion mode.

Also to be noted is that the power conversion modules (503-1, 503-2, . . . 503-N) can be of the same or different power ratings as long as they share a common switching frequency. That is, the multiple power conversion modules 503-1, 503-2, . . . 503-N operate at the same switching frequency corresponding to the switching frequency set by the controller sub-system 501.

For the purpose of operating and controlling the power conversion modules (503-1, 503-2, . . . 503-N), the adaptable DC-AC inverter system 500 is equipped with one or more sensors and one or more fault protection features such as: an input DC voltage high and low limits sensor(s) for input DC voltage high and low limits, an AC output voltage sensor(s) for voltage high and low limits for the AC output voltage, an output current limit sensor(s) for an output current limit, and/or a temperature sensor(s) for temperature.

FIG. 5 also illustrates that the communication sub-system 504 includes connectors 520-1, 520-2, 520-3, . . . 520-N. Transmission of the PWM drive signals 505 and the AC output voltages 506-1, 506-2, . . . . 506-N by the communication sub-system 504 may be performed using one or more of the connectors 520-1, 520-2, 520-3, . . . 520-N. In some examples, the connectors 520-1, 520-2, 520-3, . . . 520-N represent one or more printed circuit boards with connector interfaces to the controller sub-system 501 and the multiple power conversion modules 503-1, 503-2, . . . 503-N. In some examples, the connectors 520-1, 520-2, 520-3, . . . 520-N represent one or more cables and a connector mechanism(s) connecting the controller sub-system 501 and the multiple power conversion modules 503-1, 503-2, . . . 503-N.

Figure 6:
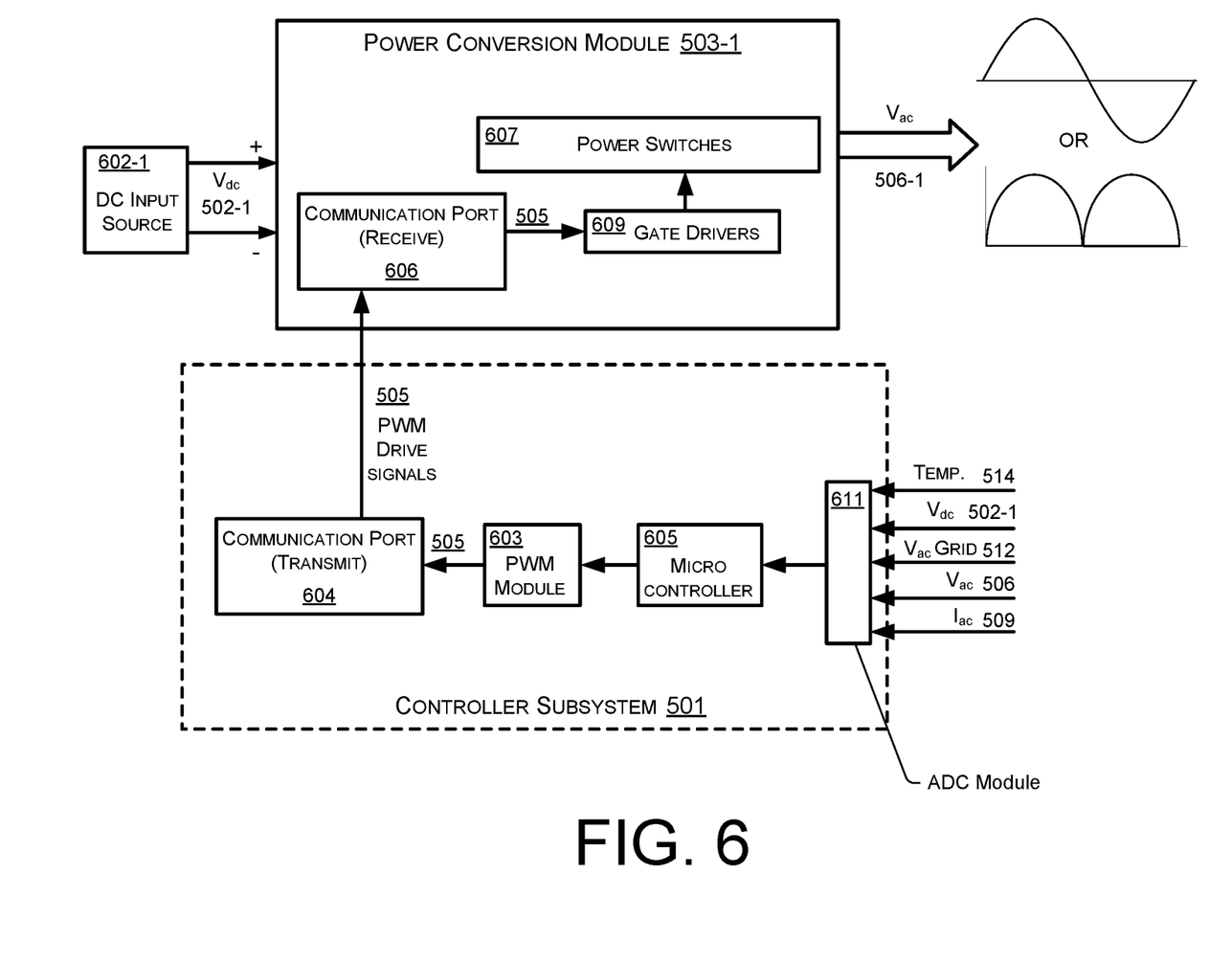
FIG. 6 is a schematic block diagram of an example controller sub-system generating the PWM drive signals and a power conversion module converting the DC input to AC output voltage employing the PWM drive signals. Also illustrated are the input signals coming into the controller sub-system for the purpose of computing the PWM duty cycles.

FIG. 6 is a schematic example of controller sub-system 501 generating the PWM drive signals 505 and a power conversion module 503-1 converting the DC input voltage 502-1 from the DC input source 602-1 (sometime referred to herein as "DC source" 602-1 or "DC voltage source" 602-1) to AC or rectified AC output voltage 506-1 employing the PWM drive signals 505. Controller sub-system 501 has a PWM module 603 for generating the PWM drive signals 505. Communication port 604 set in transmit mode transmits the PWM drive signals 505 to the power conversion module 503-1 via the communication sub-system 504. The communication port 606 in the power conversion module 503-1 set in the receiver mode receives the PWM drive signals 505 which are used for driving power switches 607 through gate drivers 609 in the power conversion module 503-1. The communication ports 604 and/or 606 may utilize a wired protocol, a wireless protocol, or combination of both the wired protocol and the wireless protocol. Also noted are the input signals from various sensors to the adaptable DC-AC inverter system 500, the input signals including AC current (Iac) 509, Vdc 502-1, Vac 506, Temperature 514 and Vac Grid 512. These input analog signals are converted to digital input by the ADC module 611 and fed to the micro controller 605. In some examples, the controller sub-system 501 incorporates at least one of a digital signals processor (DSP), a microcontroller, a Field Programmable Gate Array (FPGA), or an Application Specific Integrated Circuit (ASIC).

As an illustrative example, the PWM module 603 in the controller sub-system 501 initially generates PWM drive signals 505 at the switching frequency (for example 56 kilohertz (KHz)) of the power conversion sub-system 503 whose duty cycles are computed based on the input DC voltage Vdc 502-1 (for example 36 Volts (V)) and output AC characteristics such as, without limitation, voltage (for example 220 V), wave form (for example sine wave), and frequency (for example 50 hertz (Hz)). The PWM drive signals 505 are fed to the power conversion module 503-1 for driving the power switches 607 through the gate drives 609. The power conversion module 503-1 generates output AC voltage 506-1 of voltage, frequency, and waveform (for example 220 volts, 50 Hz, and sine wave). Once initiated, the duty cycle of the PWM drive signals 505 is dynamically controlled by the closed-loop feedback of the AC bus voltage 506 to maintain the AC bus voltage Vac 506 within specified limits (for example between 210 and 230 V). Here, the AC bus voltage (See Vac 506 in FIG. 5) may represent the system output voltage (e.g., system output AC voltage).

The AC bus voltage can be the average of the output AC voltages 506-1 to 506-N from the multiple power conversion modules 503-1 to 503-N.

Figure 7:
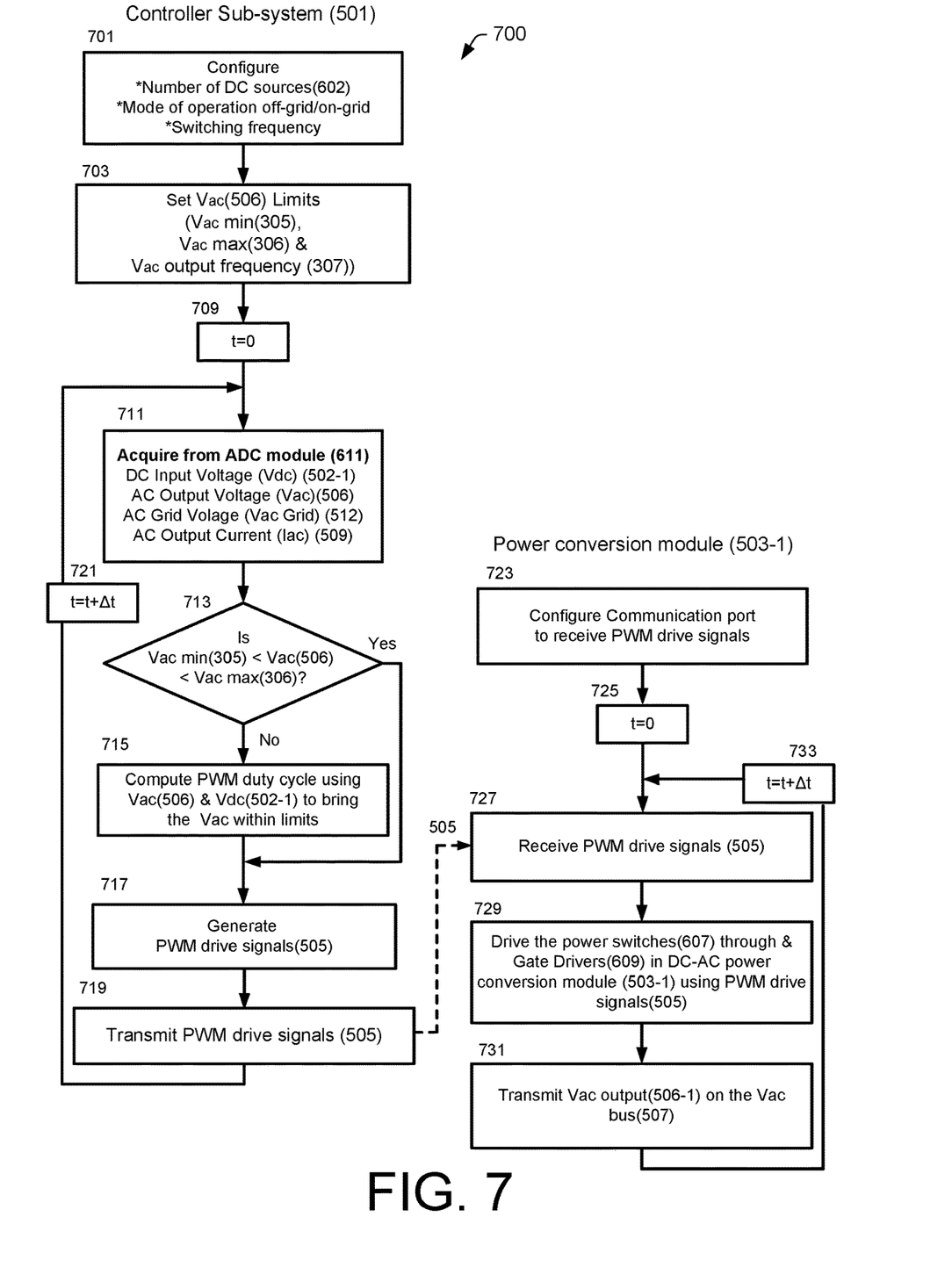
FIG. 7 is a flow diagram of an illustrative process for the operation of an adaptable DC-AC inverter system. Also illustrated is a process for generating and communicating the PWM drive signals from the controller sub-system to the power conversion modules.

FIG. 7 is a flow diagram of an illustrative process for the operation of an adaptable DC-AC inverter system 500. The process flow 700 outlines the functions of the controller sub-system 501 and a representative power conversion module 503-1. Also illustrated as part of the process flow 700 is a process for generating and communicating a PWM drive signals 505 from the controller sub-system 501 to the representative power conversion module 503-1. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

As an illustrative example, the initialization step 701 of the controller sub-system 501 involves configuring the controller sub-system 501 (or auto-configurating the adaptable DC-AC inverter system 500) for the number of DC sources 602 (and associated series of power conversion modules 503) connected to the adaptive DC-AC inverter system 500 (for example ten DC sources 602), selecting a mode of operation specified as on-grid or off-grid (for example off-grid) and the switching frequency of the power conversion module 503-1 (for example 56 KHz). The initialization step 723 of the representative power conversion module 503-1 involves configuring the communication port 606 as a receiver, such as to receive PWM drive signals 505.

The initialization step 703 sets the Vac minimum limit 305, Vac maximum limit 306, and the Vac output frequency 307 for the system output voltage Vac 506 (for example 210 V, 230 V, and 50 Hz, respectively).

The initialization step 709 sets the start clock time, t=0 for the controller sub-system 501, and the initialization step 725 sets the start clock time, t=0 for the power conversion module 503-1.

The process steps 711-721 are associated with controller sub-system 501. In process step 711, PWM module 603 acquires from the ADC module 611, the DC input voltage Vdc 502-1 and AC output voltage Vac 506 from the respective sensors. Process step 713 compares the value of Vac 506 with the Vac minimum limit 305 and Vac maximum limit 306 and verifies if the logic Vac minimum limit 305<Vac 506<Vac maximum limit 306. If this logic is satisfied, the process step 715 is skipped, and the process step 717 is performed. If the logic is not satisfied, process step 715 is performed where controller sub-system 501 computes, using Vdc 502-1 and Vac 506 values, the duty cycle for the PWM drive signals 505. In process step 717, the PWM module 603 in the controller sub-system 501 generates the PWM drive signals 505. In process step 719, the communication port 604 in the controller sub-system 501 set in the transmit mode transmits the PWM drive signals 505 to the power conversion module 503-1 via the communication sub-system 504. This process flow (steps 711-721) is repeated at high frequency (for example 56 KHz) with time interval Δt (for example 17.85 microseconds) as indicated in step 721.

The process steps 727-733 are associated with power conversion module 503-1. In process step 727, the communication port 606 in the power conversion subsystem 503-1 set in the receiver mode receives the PWM drive signals 505. In process step 729, the PWM drive signals 505 are used to drive the power switches 607 through the gate driver 609 in the power conversion module 503-1. In process step 731, the AC output voltage 506 is transmitted to an AC bus 507 of the communication sub-system 504. This process flow (steps 727-733) is repeated at high frequency (for example 56 KHz) with time interval Δt (for example 17.85 microseconds) as indicated in step 733.

In some examples, the duty cycle of the PWM drive signals 505 is dynamically controlled by the closed-loop feedback of the AC bus voltage 506 to maintain the AC bus voltage Vac 506 within specified limits (for example between 210 and 230 V). That is, in some examples, the process flow 700 may further include using a closed-loop control system to maintain the AC output voltage 506 in a predefined voltage range, wherein the predefined voltage range is defined with preset limit values for an AC output voltage minimum and an AC output voltage maximum. Such a closed-loop control system may implement a closed-loop voltage control algorithm, a closed-loop power control algorithm, or a combination thereof to maintain the AC output voltage in the predefined voltage range.

The techniques and systems disclosed herein can be implemented in different embodiments of an adaptable DC-AC inverter systems operating. As an example, power conversion modules 503-1, 503-2, . . . , 503-N in the power conversion sub-system 503 may be configured to generate a rectified AC output instead of full sine wave AC output. The rectified AC output from the power conversion modules can be transferred via the AC bus 507 of the communication sub-system 504 to a system output port 510 with a H-Bridge circuit for unfolding the rectified AC output to full sine wave AC output (e.g., to convert the rectified AC output into the full sinewave AC output). This embodiment of the adaptable DC-AC inverter eliminates the need for unfolding H-Bridge circuit in every power conversion module whose functions can be carried by single H-Bridge circuit in the system output port.

We claim:

1. An adaptable dual-mode direct current-to-alternating current (DC-AC) inverter system comprising:
   multiple direct current (DC) sources;
   a controller sub-system;
   a communication sub-system; and
   a power conversion sub-system with multiple power conversion modules that are configured to be driven by common pulse-width modulation (PWM) drive signals, wherein the controller sub-system is configured to select a mode of operation from at least one of grid-connected mode or off-grid mode based on an availability of a grid connection, and wherein the controller sub-system comprises:
      a PWM module configured to generate the common PWM drive signals at a switching frequency of the power conversion sub-system; and
      a communication port configured to transmit the common PWM drive signals to the communication sub-system,
   wherein the communication sub-system is configured to:
      transmit the common PWM drive signals received from the controller sub-system to the multiple power conversion modules of the power conversion sub-system; and
      use an alternating current (AC) bus for transmitting AC output voltages from the multiple power conversion modules to a system output port, and
   wherein each power conversion module of the multiple power conversion modules is coupled to a DC source of the multiple DC sources and is configured to:
      receive, via a communication port, the common PWM drive signals from the communication sub-system;
      generate an AC output voltage of the AC output voltages; and
      transmit the AC output voltage to the AC bus of the communication sub-system.

2. The adaptable dual-mode DC-AC inverter system of claim 1, wherein:
   individual ones of the multiple DC sources and associated power conversion modules are removable without affecting an overall function of the adaptable dual-mode DC-AC inverter system; and
   the adaptable dual-mode DC-AC inverter system is configured to add one or more additional DC sources and associated power conversion modules without affecting the overall function of the adaptable dual-mode DC-AC inverter system.

3. The adaptable dual-mode DC-AC inverter system of claim 1, wherein the adaptable dual-mode DC-AC inverter system is auto-configurable to a number of the multiple DC sources and associated power conversion modules.

4. The adaptable dual-mode DC-AC inverter system of claim 1, wherein transmission of the common PWM drive signals and the AC output voltages by the communication sub-system is performed using at least one of:
   a printed circuit board with connector interfaces to the controller sub-system and the multiple power conversion modules, or
   cables and a connector mechanism connecting the controller sub-system and the multiple power conversion modules.

5. The adaptable dual-mode DC-AC inverter system of claim 1, wherein individual ones of the multiple DC sources comprise at least one of:
   a photovoltaic solar panel;
   a fuel cell;
   a battery; or
   an ultracapacitor.

6. The adaptable dual-mode DC-AC inverter system of claim 1, wherein the multiple power conversion modules operate at a same switching frequency corresponding to the switching frequency set by the controller sub-system.

7. The adaptable dual-mode DC-AC inverter system of claim 1, wherein the adaptable dual-mode DC-AC inverter system is
   a dual-mode inverter.

8. The adaptable dual-mode DC-AC inverter system of claim 1, wherein the multiple power conversion modules are configured to:
   employ at least one of:
      one or more transformers; or
      one or more inductors; and
   operate in at least one of:
      a single-stage DC-AC conversion mode; or
      a two-stage DC-DC-AC conversion mode.

9. The adaptable dual-mode DC-AC inverter system of claim 1, wherein individual ones of the multiple power conversion modules further comprise one or more sensors and one or more fault protection features for at least one of:
input DC voltage high and low limits,
voltage high and low limits for the AC output voltage,
an output current limit; or
temperature.

10. A method of operating an adaptable dual-mode direct current-to-alternating current (DC-AC) inverter system, the method comprising:
auto-configuring the adaptable dual-mode DC-AC inverter system for a number of multiple direct current (DC) sources and associated series of power conversion modules that are configured to be driven by common pulse-width modulation (PWM) drive signals and to generate alternating current (AC) output voltages;
selecting a mode of operation from at least one of grid-connected mode or off-grid mode based on an availability of a grid connection;
generating, by a PWM module of a controller sub-system and using a closed-loop control algorithm, the common PWM drive signals at a switching frequency of a power conversion sub-system;
sending the common PWM drive signals, via a communication port of the controller sub-system, to a communication sub-system;
receiving, from the communication sub-system, via communication ports of the series of power conversion modules, the common PWM drive signals;
using the common PWM drive signals to generate an AC output voltage by the series of power conversion modules; and
transmitting the AC output voltage to an AC bus of the communication sub-system.

11. The method of claim 10, further comprising using a closed-loop control system to maintain the AC output voltage in a predefined voltage range, wherein the predefined voltage range is defined with preset limit values for an AC output voltage minimum and an AC output voltage maximum.

12. The method of claim 11, wherein the closed-loop control system implements a closed-loop voltage control algorithm, a closed-loop power control algorithm, or a combination thereof to maintain the AC output voltage in the predefined voltage range.

13. The method of claim 10, wherein the communication port of the controller sub-system utilizes a wired protocol, a wireless protocol, or combination of both the wired protocol and the wireless protocol.

14. The method of claim 10, wherein the controller sub-system incorporates at least one of a digital signals processor (DSP), a microcontroller, a Field Programmable Gate Array (FPGA), or an Application Specific Integrated Circuit (ASIC).

15. An adaptable dual-mode direct current-to-alternating current (DC-AC) inverter system comprising:
multiple direct current (DC) sources;
a controller sub-system;
a communication sub-system;
a power conversion sub-system with multiple power conversion modules that are configured to be driven by common pulse-width modulation (PWM) drive signals and to convert DC input to rectified alternating current (AC) output; and
a system output port with a H-Bridge circuit for unfolding the rectified AC output to full sine wave AC output,
wherein the controller sub-system is configured to select a mode of operation from at least one of grid-connected mode or off-grid mode based on an availability of a grid connection, and wherein the controller-sub-system comprises:
a PWM module configured to generate the common PWM drive signals at a switching frequency of the power conversion sub-system; and
a first communication port to transmit the common PWM drive signals to the communication sub-system,
wherein the communication sub-system is configured to:
transmit the common PWM drive signals received from the controller sub-system to the multiple power conversion modules of the power conversion sub-system; and
use an AC bus for transmitting the rectified AC output from the multiple power conversion modules to the system output port, and
wherein each power conversion module of the multiple power conversion modules is coupled to a DC source of the multiple DC sources and is configured to:
receive, via a second communication port, the common PWM drive signals from the communication sub-system;
generate the rectified AC output; and
transmit the rectified AC output to the AC bus of the communication sub-system,
wherein the H-Bridge circuit in the system output port performs the unfolding to convert the rectified AC output into the full sinewave AC output.

16. The adaptable dual-mode DC-AC inverter system of claim 15, wherein:
individual ones of the multiple DC sources and associated power conversion modules are removable without affecting an overall function of the adaptable dual-mode DC-AC inverter system; and
the adaptable dual-mode DC-AC inverter system is configured to add one or more additional DC sources and associated power conversion modules without affecting the overall function of the adaptable dual-mode DC-AC inverter system.

17. The adaptable dual-mode DC-AC inverter system of claim 15, wherein the adaptable dual-mode DC-AC inverter system is auto-configurable to a number of the multiple DC sources and associated power conversion modules.

18. The adaptable dual-mode DC-AC inverter system of claim 15, wherein transmission of the common PWM drive signals and the rectified AC output by the communication sub-system is performed using at least one of:
a printed circuit board with connector interfaces to the controller sub-system and the multiple power conversion modules, or
cables and a connector mechanism connecting the controller sub-system and the multiple power conversion modules.

19. The adaptable dual-mode DC-AC inverter system of claim 15, wherein individual ones of the multiple power conversion modules further comprise one or more sensors and one or more fault protection features for at least one of:
input DC voltage high and low limits;
voltage high and low limits for the rectified AC output;
an output current limit; or
temperature.

* * * * *